(12) United States Patent
Gaal et al.

(10) Patent No.: US 8,811,371 B2
(45) Date of Patent: Aug. 19, 2014

(54) TRANSMIT DIVERSITY SCHEME FOR UPLINK DATA TRANSMISSIONS

(75) Inventors: Peter Gaal, San Diego, CA (US); Juan Montojo, San Diego, CA (US); Xiliang Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 12/564,809

(22) Filed: Sep. 22, 2009

(65) Prior Publication Data

US 2010/0091641 A1 Apr. 15, 2010

Related U.S. Application Data

(60) Provisional application No. 61/099,396, filed on Sep. 23, 2008, provisional application No. 61/100,360, filed on Sep. 26, 2008.

(51) Int. Cl.
*H04J 11/00* (2006.01)
*H04W 4/00* (2009.01)
*H03L 7/00* (2006.01)
*H04L 27/06* (2006.01)

(52) U.S. Cl.
USPC ............ 370/344; 370/208; 375/299; 375/346

(58) Field of Classification Search
USPC .......... 370/208, 210, 260, 344; 375/130, 135, 375/295, 299, 346
See application file for complete search history.

(56) References Cited

U.S. PATENT DOCUMENTS

| | | |
|---|---|---|
| 2007/0041457 A1 | 2/2007 | Kadous et al. |
| 2007/0160160 A1 | 7/2007 | Kakura |
| 2008/0032746 A1 | 2/2008 | Olesen et al. |
| 2008/0212556 A1* | 9/2008 | Heo et al. ...................... 370/344 |
| 2009/0135748 A1* | 5/2009 | Lindoff et al. ................ 370/296 |
| 2009/0303866 A1* | 12/2009 | Li et al. .......................... 370/208 |
| 2010/0041350 A1* | 2/2010 | Zhang et al. ................... 455/101 |
| 2010/0080112 A1* | 4/2010 | Bertrand et al. ............... 370/208 |

FOREIGN PATENT DOCUMENTS

| | | |
|---|---|---|
| CN | 101132387 A | 2/2008 |
| WO | 2008021008 A2 | 2/2008 |

OTHER PUBLICATIONS

"STBC-II Scheme for Uplink Transmit Diversity in LTE-Advanced", 3GPP TSG RAN WG1 Meeting #53bis, R1-082500 Warsaw, Poland, Jun. 30-Jul. 4, 2008.
"Uplink Transmit diversity schemes for LTE Advanced", 3GPP TSG RAN WG1 #53bis meeting, R1-082522, Warsaw, Poland, Jun. 30-Jul. 4, 2008
Alamouti, S.M., "A Simple Transmit Diversity Technique for Wireless Communications," IEEE Journal on Select Areas in Communications, vol. 16, No. 8, Oct. 1998, pp. 1451-1458.

(Continued)

*Primary Examiner* — Awet Haile
(74) *Attorney, Agent, or Firm* — Kenyon S. Jenckes

(57) ABSTRACT

Systems and methods are described herein for transmitting uplink SC-FDMA symbols. When an extended cyclic prefix is used, the symbols are divided into pairs, and the first symbol and a function of the second symbol in each pair is transmitted via a first antenna and the second symbol and a function of the first symbol in each pair is transmitted via a second symbol. When an unpaired symbol remains, the unpaired symbol is divided into halves, and a first function of the halves is transmitted on the first antenna and a second function of the halves is transmitted on the second antenna.

28 Claims, 13 Drawing Sheets

(56) References Cited

OTHER PUBLICATIONS

International Search Report and Written Opinion—PCT/US2009/058103, International Search Authority—European Patent Office—Jan. 13, 2010.
Alcatel Shanghai Bell, Alcatel-Lucent, "STBC-II Scheme with Non-Paired Symbols for LTE-Advanced Uplink Transmit Diversity", 3GPP TSG RAN WG1 Meeting #54,R1-082817, Aug. 22, 2008.

Nortel, "Consideration on Transmit Diversity for PUSCH in LTE-A", 3GPP TSG-Ran Working Group 1 Meeting #54,R1-083150, Aug. 22, 2008.
Spreadtrum Communications, SRS frequency hopping on UpPTS in LTE TDD, Discussion and decision, R1-082031, 3GPP TSG RAN WG1#53 meeting Kansas, USA, May 5-9, 2008.

* cited by examiner

TRANSMIT DIVERSITY SCHEME FOR UPLINK DATA TRANSMISSIONS

CLAIM OF PRIORITY UNDER 35 U.S.C. §119

The present Application for Patent claims priority to Provisional Application No. 61/099,396 entitled "Transmit Diversity for LTE UL with Extended Cyclic Prefix" filed Sep. 23, 2008, and to Provisional Application No. 61/100,360 entitled "Transmit Diversity Technique for Single Carrier Frequency Division Multiplexing Signals" filed on Sep. 26, 2008, both of which are assigned to the assignee hereof and hereby expressly incorporated by reference herein.

BACKGROUND

1. Field

This application related generally to wireless communications, and more particularly to allocating resources for control and data transmissions.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

In communications systems such as LTE systems, a cyclic prefix may be added when transmitting symbols. When the normal cyclic prefix is used, six data symbols may be transmitted in a slot. An extended cyclic prefix may also be used. In this case, five data symbols may be transmitted in a slot.

For transmit diversity, symbols may be transmitted over multiple antennas. It would be desirable to have systems and methods to perform transmit diversity when transmitting uplink SC-FDMA symbols.

SUMMARY

In one aspect of the disclosure, a method for transmitting uplink SC-FDMA symbols where an extended cyclic prefix is used comprises determining whether intra-sub-frame frequency hopping is enabled; upon determining that intra-sub-frame frequency hopping is not enabled: combining SC-FDMA symbols from two consecutive slots in a sub-frame into a symbol stream; dividing the symbols in the symbol stream into pairs; for each pair, transmitting the first symbol and a function of the second symbol on a first antenna; and for each pair, transmitting the second symbol and a function of the first symbol on a second antenna.

In another aspect of the disclosure, a system for transmitting uplink SC-FDMA symbols where an extended cyclic prefix is used comprises means for determining whether intra-sub-frame frequency hopping is enabled; upon determining that intra-sub-frame frequency hopping is not enabled: means for combining SC-FDMA symbols from two consecutive slots in a sub-frame into a symbol stream; means for dividing the symbols in the symbol stream into pairs; for each pair, means for transmitting the first symbol and a function of the second symbol on a first antenna; and for each pair, means for transmitting the second symbol and a function of the first symbol on a second antenna.

In yet another aspect of the disclosure, a system for transmitting uplink SC-FDMA symbols where an extended cyclic prefix is used comprises a first antenna; a second antenna; and a transmit diversity module configured to dividing the symbols pairs, transmit the first symbol and a function of the second symbol in each pair on the first antenna, and to transmit the second symbol and a function of the first symbol in each pair on the second antenna.

In still another aspect of the disclosure, a computer program product comprises a computer readable medium which comprises code for determining whether intra-sub-frame frequency hopping is enables; upon determining that intra-sub-frame frequency hopping is not enabled, code for combining SC-FDM symbols from two consecutive slots in a sub-frame into a symbol stream; code for dividing the symbols in the symbol stream into pairs; for each pair, code for transmitting the first symbol and a function of the second symbol on a first antenna; and for each pair, code for transmitting the second symbol and a function of the first symbol on a second antenna.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
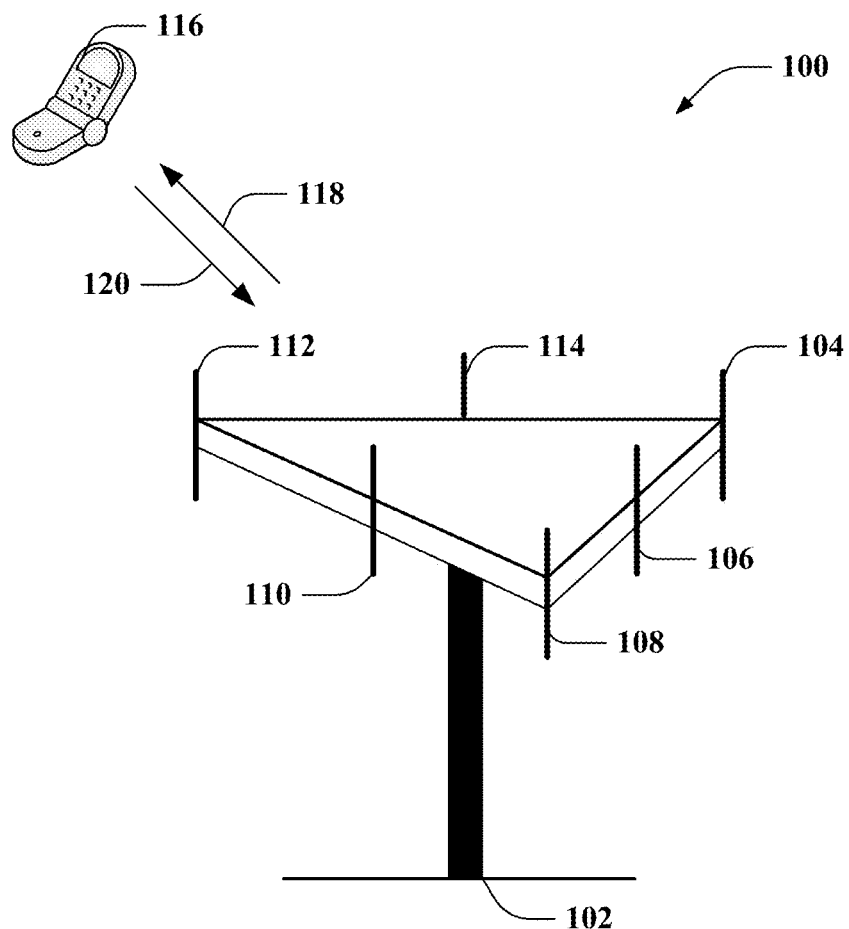
FIG. 1 illustrates a multiple access wireless communication system.

Referring to FIG. 1, a wireless communication system 100 which may implement various disclosed aspect is illustrated. Wireless communication system 100 may implement, for example, protocols specified by 3GPP LTE. An access point 102 (AP) may include multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Each group of antennas and/or the area in which they are designed to communicate is often referred to as a sector of the access point. In the embodiment, antenna groups each are designed to communicate to access terminals in a sector, of the areas covered by access point 100.

An AP may be a fixed station used for communicating with the terminals and may also be referred to as an access node, a Node B, or some other terminology. An AT may also be called a terminal, user equipment (UE), a wireless communication device, or some other terminology.

Figure 2:
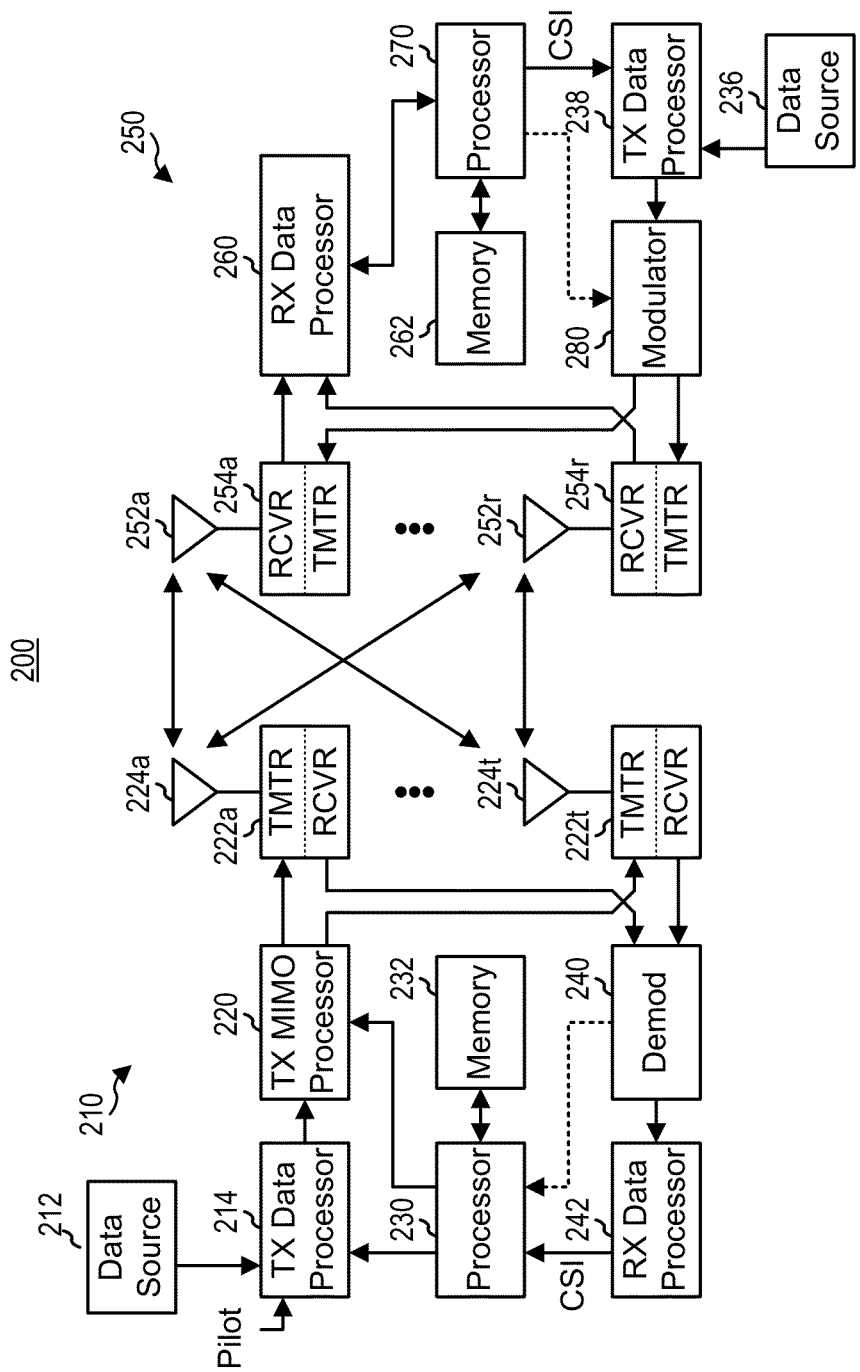
FIG. 2 depicts a MIMO transmitter and receiver.

FIG. 2 is a block diagram of an embodiment of a transmitter system 210 and a receiver system 250 in a MIMO system 200. For downlink transmission, transmitter 210 is part of an AP, and receiver system 250 is part of an AT. At the transmitter system 210, traffic data for a number of data streams is provided from a data source 212 to a transmit (TX) data processor 214.

Each data stream may be transmitted over one or more of transmit antennas 224a-224t. TX data processor 214 formats, codes, and interleaves the traffic data for each data stream based on a particular coding scheme selected for that data stream to provide coded data.

The coded data for each data stream may be multiplexed with pilot data. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM or SC-FDMA). TX MIMO processor 220 then provides $N_T$ modulation symbol streams to $N_T$ transmitters (TMTR) 222a through 222t. TX MIMO processor 220 may apply a transmit diversity scheme to the symbols of the data stream by transmitting the symbol or some function of the symbol through multiple antennas. For example, TX MIMO processor 220 may apply a space time transmit diversity (STTD) operation to the symbols. Other transmit diversity schemes may also be applied. Moreover, symbol processing techniques other that transmit diversity may also be applied.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. Processor 270 may direct the operation of various processing units at receiver 250.

Figure 3:
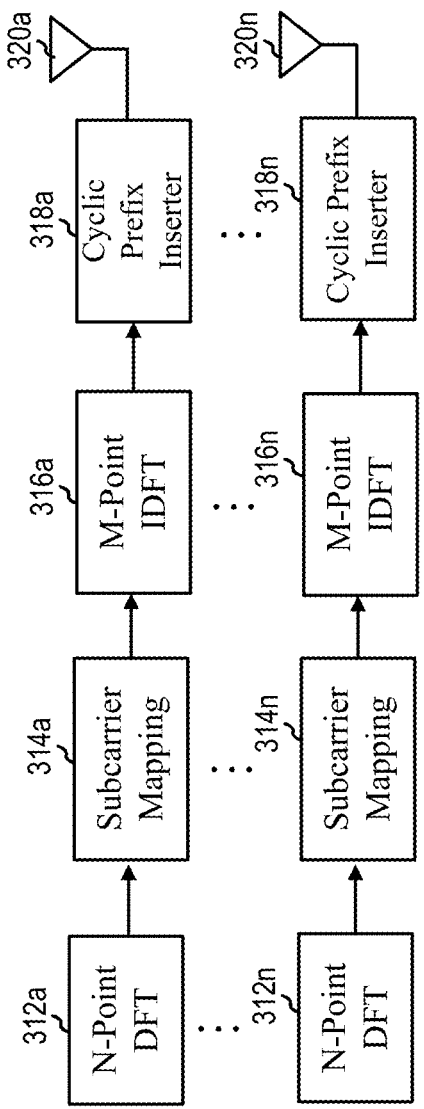
FIG. 3 depicts an exemplary MIMO SC-FDMA transmitter.

The systems and methods described herein may be configured to implement LTE technology. In an LTE system, downlink (DL) transmissions use OFDM while uplink (UL) transmissions use SC-FDMA. As used herein, DL refers to a communications originating at an AP destined for an AT, while UL refers to communications originating from an AT destined for an AP. FIG. 3 depicts an exemplary SC-FDMA transmitter that may be used for uplink communications in a MIMO communication system. An N-Point DFT may be performed on data symbols using N-Point DFT 312a-312n. The data symbols are then mapped to M sub-carriers at 314a-314n. Typically, the number of subcarriers is larger than the number of data symbols. As such, subcarrier mapping may include zero-filling. Next, an M-Point IDFT is performed at 316a-316n to transform the symbols to the time domain. Cyclic prefix inserters 318a-318n insert a cyclic prefix to each symbol, and the symbols are transmitted via one or more transmit antennas 320a-320n.

Figure 4:
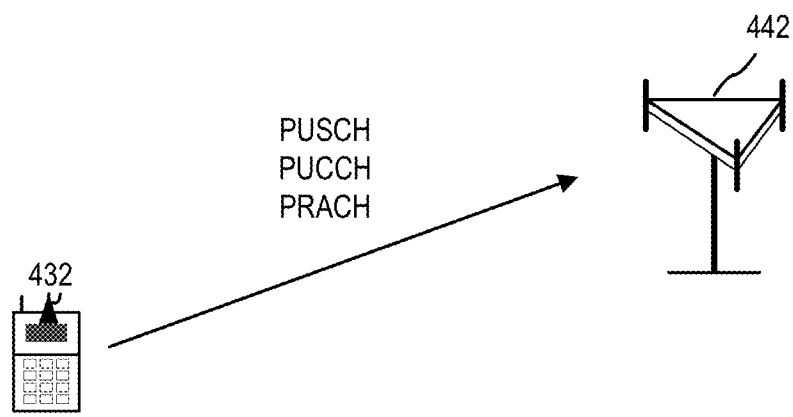
FIG. 4 depicts uplink data and control signals.

As depicted in FIG. 4, an access terminal 432 communicatively coupled to access point 442 may transmit on various physical uplink channels. For example, as illustrated in FIG.

4, uplink transmissions may include a physical uplink shared channel (PUSCH), a physical uplink control channel (PUCCH), and a physical random access channel (PRACH). Other uplink transmission channels may also be included. The PUSCH may be used for UL data transmission. The PUCCH carries uplink control information, and may support multiple frame formats. The PRACH carries random access assignment information.

Figure 5:
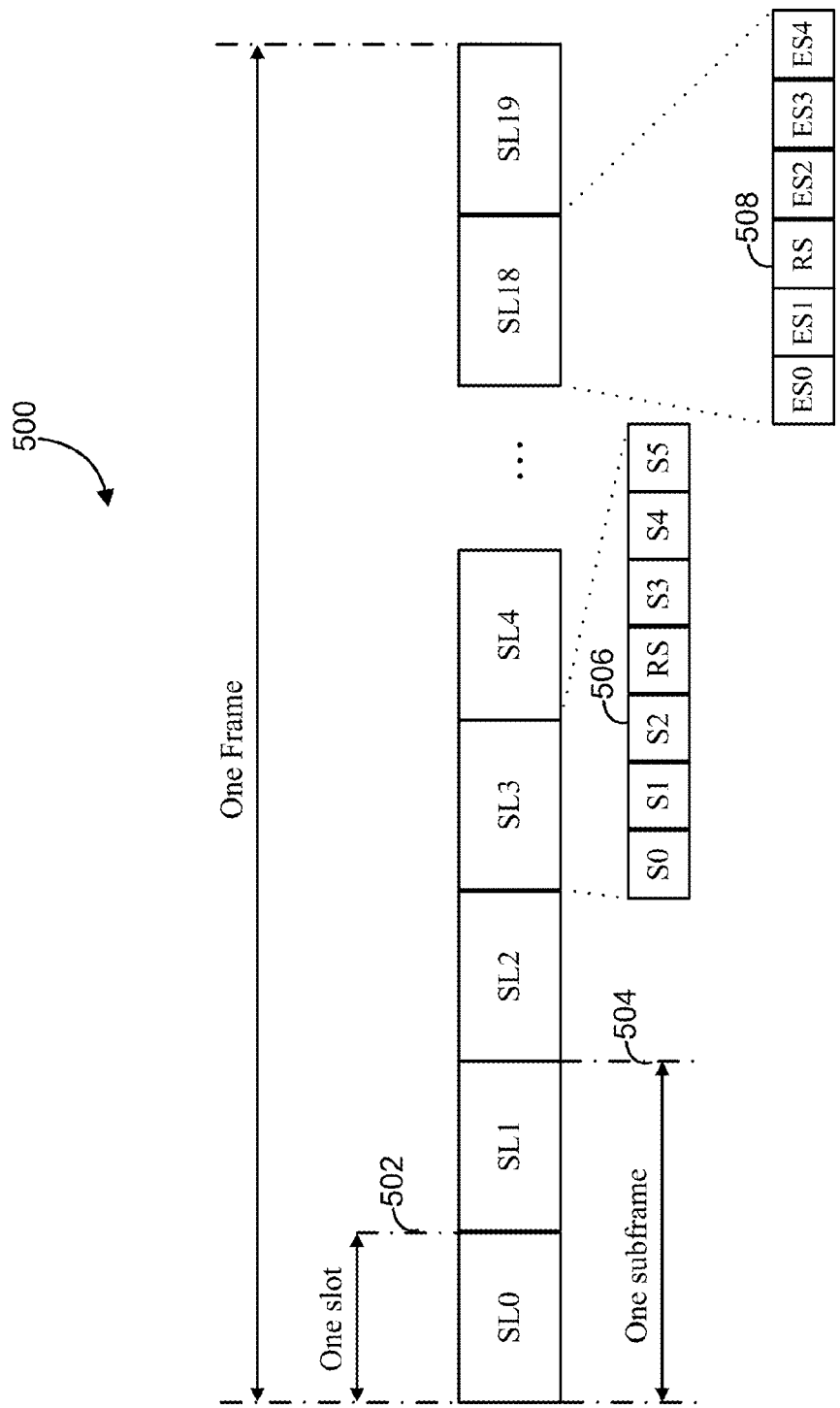
FIG. 5 depicts an exemplary LTE frame structure.

FIG. 5 depicts an exemplary frame structure of an LTE frame 200. LTE frame 500 may be used for uplink and downlink physical layer transmissions. LTE frame 500 may be 10 ms in length and may comprise 20 slots 502. As depicted in FIG. 5, slots 502 are numbered SL0 through SL19. Each slot 502 is 0.5 ms in length. Two consecutive slots 502 are known as a subframe, as depicted at 504. Thus, LTE frame 200 comprises 10 subframes. It is noted that LTE frame 500 is merely an exemplary LTE frame structure that may be used for full duplex and half duplex FDD. Other frame types/structures may also be applied such as, for example, the TDD frame structure described in 3GPP TS 36.211, the contents of which are incorporated herein by reference.

Each slot 502 may be configured to transmit multiple SC-FDMA symbols. The number of SC-FDMA symbols transmitted in a slot depends on the cyclic prefix length. When a normal cyclic prefix is used, a slot may transmit seven symbols, as depicted at 506. When an extended prefix is used, six SC-FDMA symbols may be transmitted, as depicted at 508. As is further depicted at 506 and 508, each slot may also transmit a reference symbol RS in addition to the regular data or control symbols. The reference symbols may be used, for example, to aid in demodulation or channel sounding. Thus, excluding the reference symbol RS, slot 506 may be used to transmit six symbols while slot 508 may be used to transmit five symbols.

Figure 6:
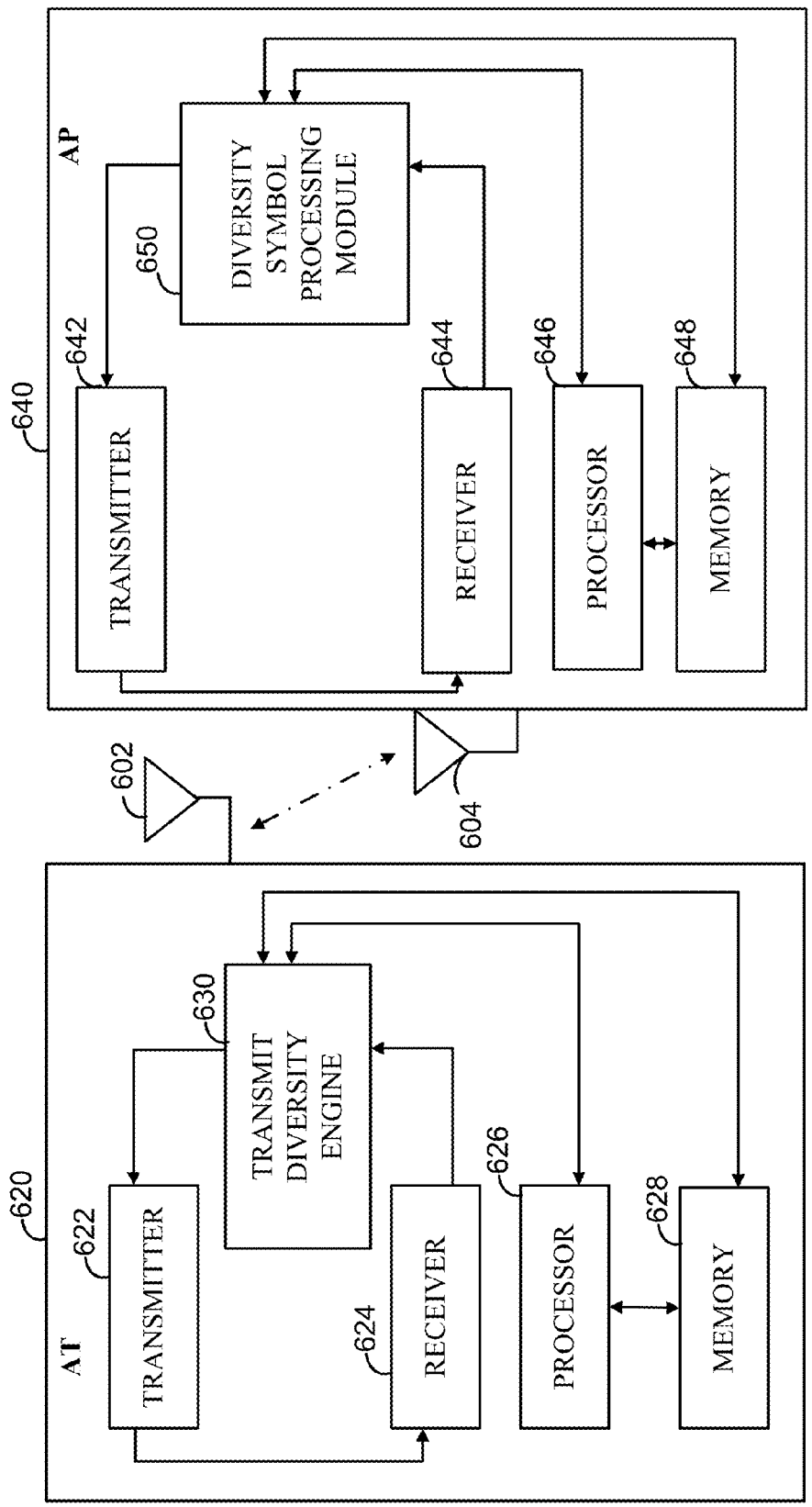
FIG. 6 depicts and exemplary wireless communication system.

FIG. 6 depicts an exemplary communications system 400 comprising one or more ATs 620 and one or more APs 640. While only one AT 620 and one AP 640 is illustrated in FIG. 6, it should be appreciated that system 600 may include any suitable number of ATs 620 and APs 640.

AT 620 and AP 640 may perform UL and DL communications via one or more antennas 602 and 604. While only a single antenna is shown associated with each of AT 620 and AP 640, multiple antennas may be provided to allow for transmit diversity, as described above. An UL transmission may originate at AT 620 via a transmitter 622. The UL data may then be transmitted via transmitter 622 and antenna 602, where it can be received by receiver 644 at AP 640 via antenna 604. AT 620 further comprises a processor 626 and a memory 628, which may be used by AT 620 to implement various aspects described herein. For example, processor 626 may be configured to instruct transmit diversity engine 630 transmit data via a plurality of antennas. It is noted that while transmit diversity engine 630 is depicted separately from processor 626, those of ordinary skill in the art would recognized that the functions performed by transmit diversity engine 630 are typically integrated with a processor. Thus, transmit diversity engine 630 may be a software module forming part of processor 626.

Transmit diversity (TD) is a technique employed to counter the effects of fading, scattering, reflection, refraction, and other interference with the signal by transmitting multiple copies of a data stream across a number of antennas. For example, a primary signal transmitted through a first antenna and a secondary altered version of the primary signal through a second antenna may be exploited in combination when received to improve the reliability of the transferred data. This redundancy results in a higher likelihood that one or more received copies of the signal will carry to the receiver a complete copy of the transmitted data.

One of many possible TD scheme for an LTE multiple-access system uplink (UL) is Open Loop Transmit Diversity (OL TD). In these OL systems the receiver does not send feedback to the transmitter regarding the optimum transmit signal configuration. An efficient way of operating an OL TD scheme is to find pairs of transmitted modulation symbols and apply some form of space time coding on them, which combines all copies of the signal in an optimal way to extract the maximum amount of information.

Transmit antennas may be either physical or virtual. For channel estimation purposes, the transmit antennas can use two different orthogonal cyclic shifts of the demodulation reference signal (DM-RS) specified for LTE in 3GPP Release 8, the specification of which is incorporated herein by reference. Other orthogonal schemes may also be used. In this way, the channel corresponding to the two transmit antennas can be measured without cross interference.

Transmit diversity engine 630 may be configured to perform one or more transmit diversity operations for uplink data transmission. For example, STTD may be performed. Transmit diversity engine 630 maybe configured to determine whether intra-sub-frame frequency hopping is enabled. Transmit diversity engine 630 may be configured to determine whether data to be transmitted has an extended cyclic prefix associated therewith, and, as such, whether an odd number of data symbols are to be transmitted. When the UL channel is not configured to perform intra-sub-frame frequency hopping, transmit diversity engine 630 may be configured to pair data symbols from two consecutive slots within a sub-frame. Each symbol or a function of the symbol may be transmitted via each of a plurality of transmit antennas.

When intra-sub-frame frequency hopping is configured on an UL transmit channel, symbols from two consecutive slots cannot be combined. Thus, according to some aspects, transmit diversity engine 630 may be configured to pair the first four data symbols of a time slot, and to transmit those symbols in the same manner as when intra-sub-frame frequency hopping is employed. Transmit diversity engine 630 may be configured to divide the fifth symbol into two portions. A first function of the divided symbols may be transmitted on a first antenna while a second function of the divided symbols may be transmitted on a second antenna to achieve diversity. For example, assume the unpaired fifth symbol includes twelve bits. The first 6 bits may be used for the first portion while the second 6 bits may be used for the second portion.

The unpaired fifth symbol may also be paired in other manners. For example consecutive bits within a symbol may be paired. At a first time period, a first bit may be transmitted via a first antenna and a second bit via a second antenna. Then, at a second time period, some function, such as the complex conjugate, of the second bit may be transmitted via the first antenna while some function, such as the inverse complex conjugate, of the first bit may be transmitted via the second antenna. In other examples, even numbered bits may be transmitted via a first antenna and odd numbered bits may be transmitted via the second antenna in a first time period, while a function of the odd numbered bits may be transmitted via a first antenna and a function of the even numbered bits may be transmitted via the second antenna in a second time period.

AP 640 comprises a receiver 644 that receives transmissions from AP 620 via antenna 604. AP 640 may further comprise diversity symbol processing module 650 that may be configured by processor 646 to process data symbols received from AT 620. In the case of an odd number of symbols described above, upon receipt of the single unpaired symbol, diversity symbol processing module 650 may receive the symbol including channel impulse responses corresponding to the transmit antennas. The symbol may also include a noise/interference component. AP 640 further comprises a transmitter 642 for transmitting data and control information to AT 620 or other ATs via antenna 604. As in AT 620, a memory 648 is provided in AP 640 for implementing various disclosed aspects.

Figure 7:
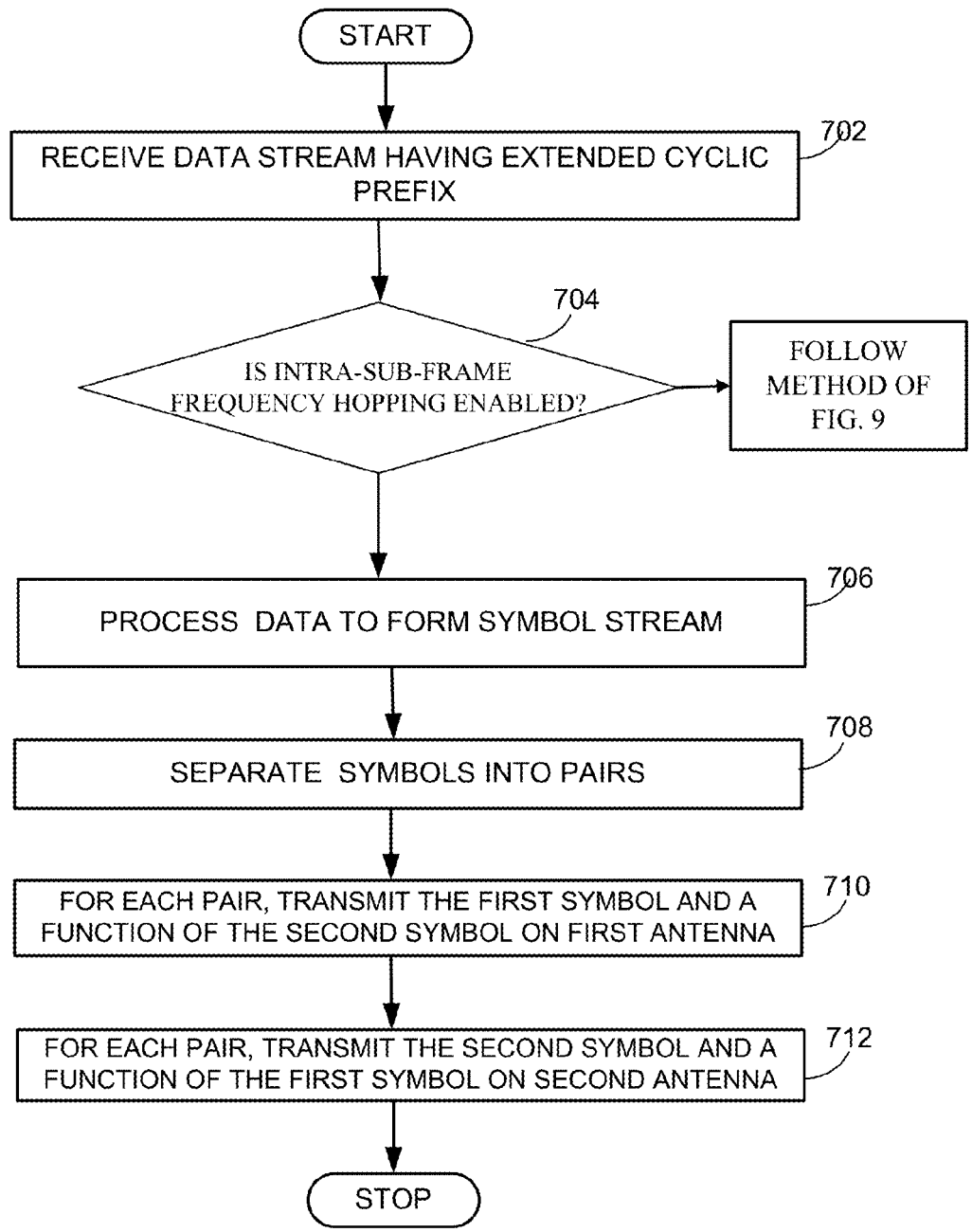
FIG. 7 is a flowchart depicting an exemplary uplink data transmission method where intra-sub-frame hopping is disabled.

FIG. 7 is a flowchart depicting an exemplary method of UL data transmission. As depicted at 702, a data stream may be received wherein an extended cyclic prefix was used to transmit the data symbols. As such, each slot in a sub-frame may transmit five data symbols. Next, a determination is made as to whether intra-sub-frame frequency hopping has been enabled, as depicted at 704. If intra-sub-frame frequency hopping has been enabled, the method depicted in FIG. 9 (described below) is followed.

If intra-frame frequency hopping has not been enabled, the symbols of two consecutive slots within a sub-frame can be combined. Thus, as depicted at 706, the data across two consecutive slots may be processed to form a single symbol stream. As depicted at 708, the symbol stream may be separated into pairs of data symbols.

According to some aspects, two transmit antennas may be used for transmit diversity. For example, an STTD transmit diversity scheme may be employed. As depicted at 710, for each pair of data symbols, the first symbol of the pair and a function of the second symbol of the pair may be transmitted via a first transmit antenna. The function of the second symbol may be, for example, the complex conjugate of the second symbol, in accordance with some aspects. However, this is merely exemplary. Any function of the second symbol may be used such as, for example, the time reversed complex conjugate of the second symbol, a cyclically delayed version of the second symbol, and/or any other function.

As depicted at 712, for each pair of data symbols, the second symbol of the pair and a function of the first symbol of the pair may be transmitted via a second transmit antenna. Like the functions of the second symbol, the function of the first symbol may be, for example, the complex conjugate of the first symbol, the time reversed complex conjugate of the first symbol, a cyclically delayed version of the first symbol, and/or any other function of the first symbol. By transmitting either the symbol or a function of the symbol via each antenna, each symbol is able to experience the channel from a different antenna.

Figure 8:
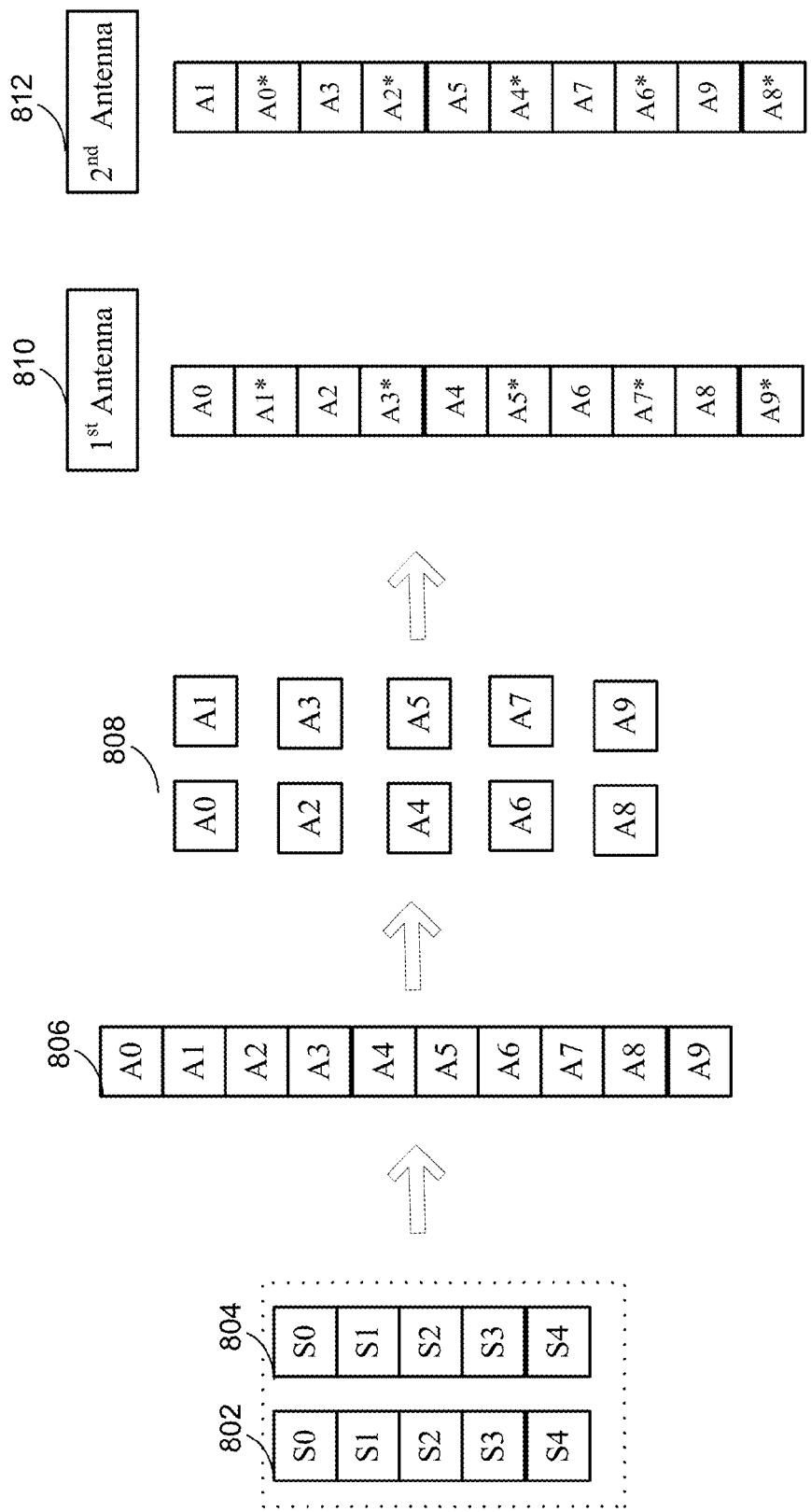
FIG. 8 is a block diagram depicting the exemplary uplink data transmission method of FIG. 7.

FIG. 8 is a block diagram depicting an exemplary UL data transmission using the process depicted in FIG. 7. A sub-frame comprising a first slot 802 and a second slot 804 is received. Because intra-sub-frame frequency hopping is not enabled, symbols S0-S4 of the first slot 802 and symbols S0-S4 of the second slot 804 may be combined into a single data stream. Thus, as depicted at 806, a data stream may be formed comprising symbols A0-A9.

As depicted at 808, the data symbols are paired. A first pair comprises symbols A0 and A1, a second pair comprises symbols A2 and A3, a third pair comprises symbols A4 and A5, a fourth pair comprises symbols A6 and A7, and a fifth pair comprises symbols A8 and A9. The symbols may then be transmitted via first antenna 810 and second antenna 812.

In the exemplary transmission shown in FIG. 8, in a first time slot, symbol A0 is transmitted via first antenna 810 and A1 is transmitted via second antenna 812. In a second time slot, the time reversed complex conjugate of A1, [A1]*, is transmitted via the first antenna 810 while the negative of the time reversed complex conjugate of A0, [−A0]*, is transmitted via the second antenna. We use the notation [X]* representing the time reversed complex conjugate of X. The remaining symbols are transmitted in a similar manner.

Figure 9:
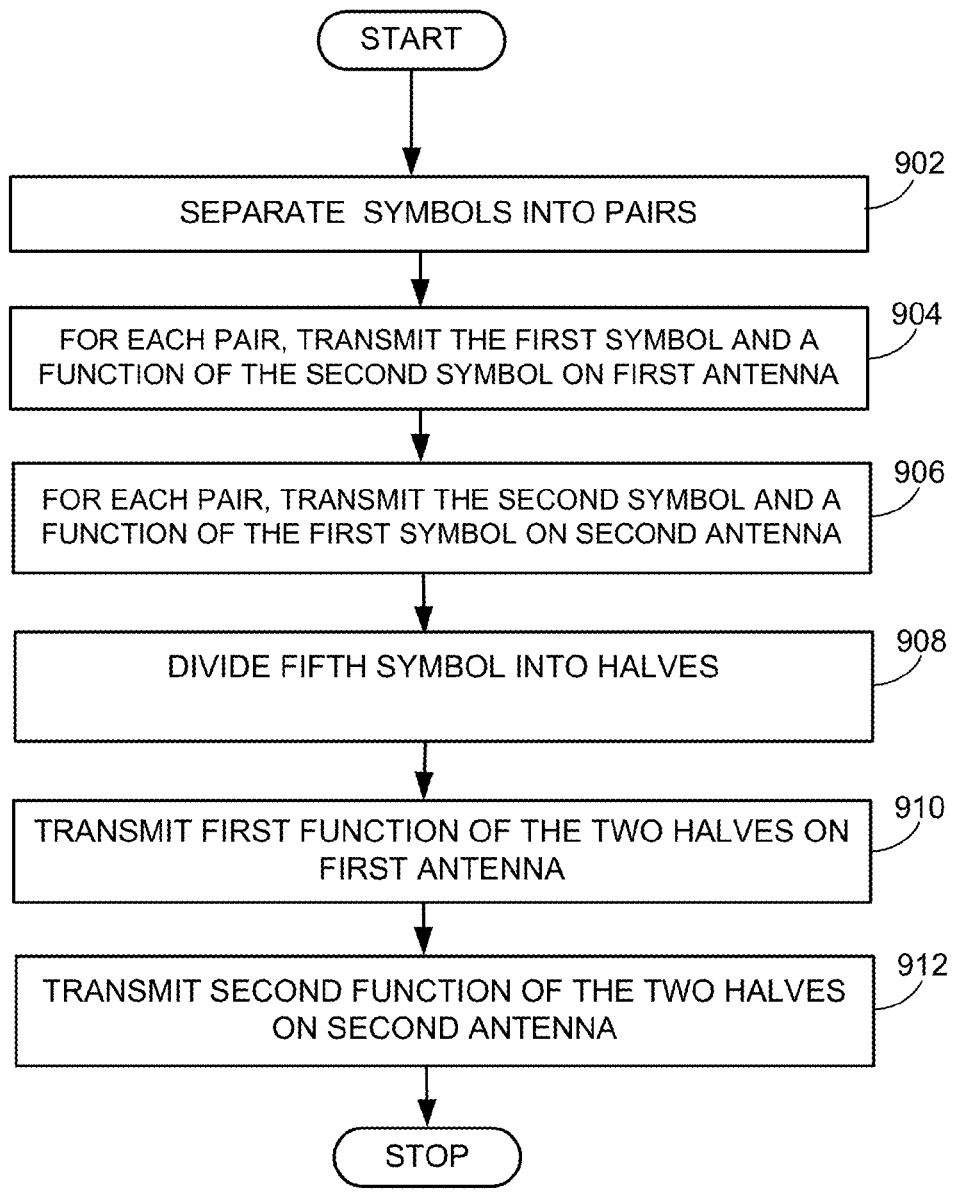
FIG. 9 is a flowchart depicting an exemplary uplink data transmission method where intra-sub-frame hopping is enabled.

FIG. 9 is a flowchart depicting a method of transmitting UL data symbols wherein intra-sub-frame hopping is enabled. When intra-sub-frame hopping is enabled, data across two consecutive slots in a sub-frame cannot be combined. As such, when an extended cyclic prefix is used, every symbol within a slot cannot be paired for transmission. As depicted at 902, the first four symbols may be arranged into two pairs. As depicted at 904, for each pair of data symbols, the first symbol of the pair and a function of the second symbol of the pair may be transmitted via a first transmit antenna.

For each pair of data symbols, the second symbol of the pair and a function of the first symbol of the pair may be transmitted via a second transmit antenna, as depicted at 906. The function of the first or second symbol may be, for example, the complex conjugate of the first symbol, the time reversed complex conjugate of the first symbol, a cyclically delayed version of the first symbol, and/or any other function of the first symbol.

As depicted at 908, the fifth symbol may be divided into two halves prior to performing a DFT operation. A first function of the two halves may be transmitted via the first antenna as depicted at 910, while a second function of the two halves may be transmitted on the second antenna, as depicted at 912. For example, the following function may be transmitted on the first antenna: IFFT(DFT([A($M_1$); A($M_2$)])), wherein $M_1$ and $M_2$ represent the first half and the second half, respectively, of the fifth symbol and [A($M_1$); A($M_2$)] denotes the concatenation of the two halves. On the second antenna, the following function may be transmitted: IFFT(DFT([A($M_1$); −A($M_2$)]))*, wherein $M_1$ and $M_2$ represent the first half and the second half, respectively, of the fifth symbol and [A($M_1$); A($M_2$)]* denotes the time reversed complex conjugate of the concatenation of the two halves. Other functions of the two halves may be used alternatively.

At an AP, the received, unpaired signal may be expressed as y(t)=h1*x1(t)+H2*x2(t)+n(t). After processing the unpaired symbol, the modulation symbol estimate may be represented by the following:

$$\hat{s} = IDFT\left\{\frac{H_1^*}{|H_1|^2 + |H_1|^2 + N^2} \cdot IFFT\{y(t)\}\right\} +$$
$$q \cdot IDFT\left\{\frac{H_2}{|H_1|^2 + |H_1|^2 + N^2} \cdot (IFFT\{y(t)\})^*\right\}$$

In the above function, $H_1$ and $H_2$ are the frequency domain channel transfer functions corresponding to the AT transmit antennas, respectively. $N^2$ represents the noise power spectrum value and q is a step function, which is +1 in the first half of the modulation symbol and −1 in the second half.

Figure 10:
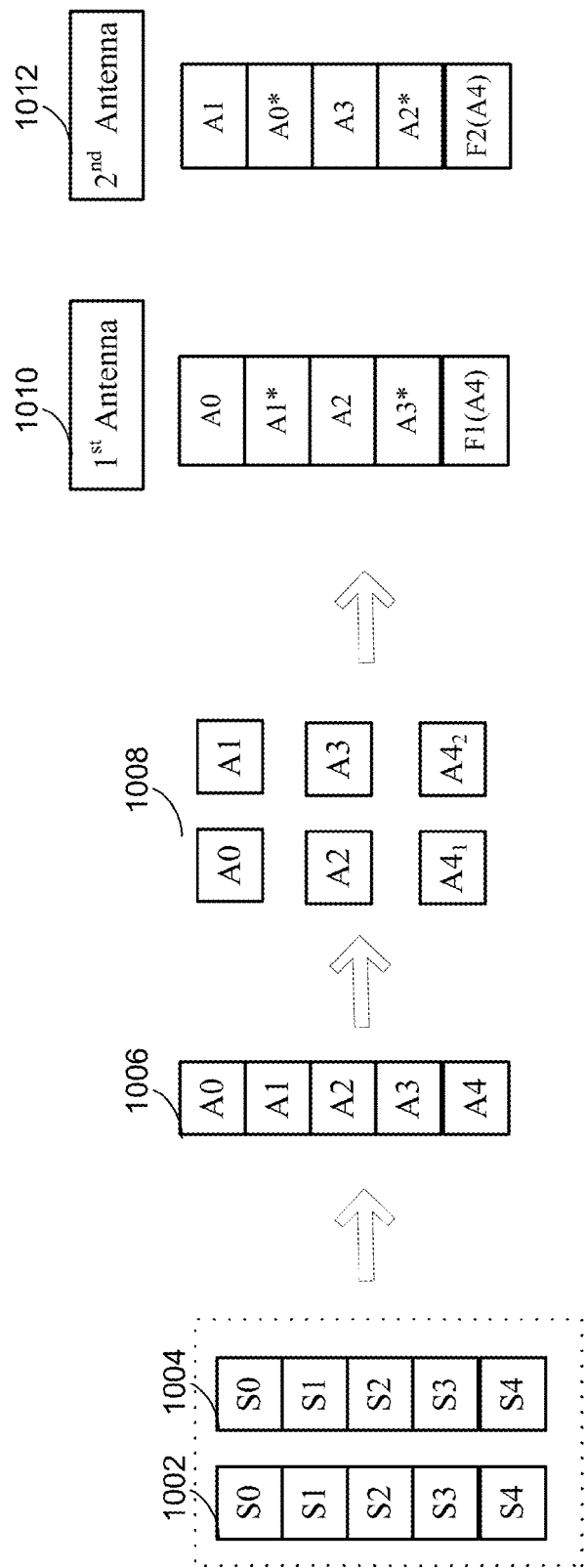
FIG. 10 is a block diagram depicting the exemplary uplink data transmission method of FIG. 9.

FIG. 10 is a block diagram depicting an exemplary UL data transmission using the process depicted in FIG. 9. A sub-frame comprising a first slot 1002 and a second slot 1004 is received. Because intra-sub-frame frequency hopping is enabled, symbols S0-S4 of the first slot 1002 and symbols S0-S4 of the second slot 1004 may not be combined into a single data stream. Thus, as depicted at 1006, a data stream may be formed comprising symbols A0-A4 may be processed for separately for each slot. Only processing for the first slot is depicted.

As depicted at 1008, the first four data symbols are arranged into two pairs. A first pair comprises symbols A0 and A1, a second pair comprises symbols A2 and A3. The fifth symbol is divided into two halves, $A4_1$ and $A4_2$. The symbols may then be transmitted via first antenna 1010 and second antenna 1012.

In the exemplary transmission shown in FIG. 10, in a first time slot, symbol A0 is transmitted via first antenna 1010 and A1 is transmitted via second antenna 1012. In a second time slot, the time reversed complex conjugate of A1, [A1]*, is transmitted via the first antenna 1010 while the negative time reversed complex conjugate of A0, [−A0]*, is transmitted via the second antenna 1012. The second pair of symbols is transmitted in a similar manner. For the fifth symbol, first function of the two halves, such as the IFFT(DFT([$A4_1$; $A4_2$])), is transmitted via the first antenna 1010 while a second function of the two halves, such as IFFT(DFT([$A4_1$; −$A4_2$]))* is transmitted via the second antenna 1012.

Figure 11:
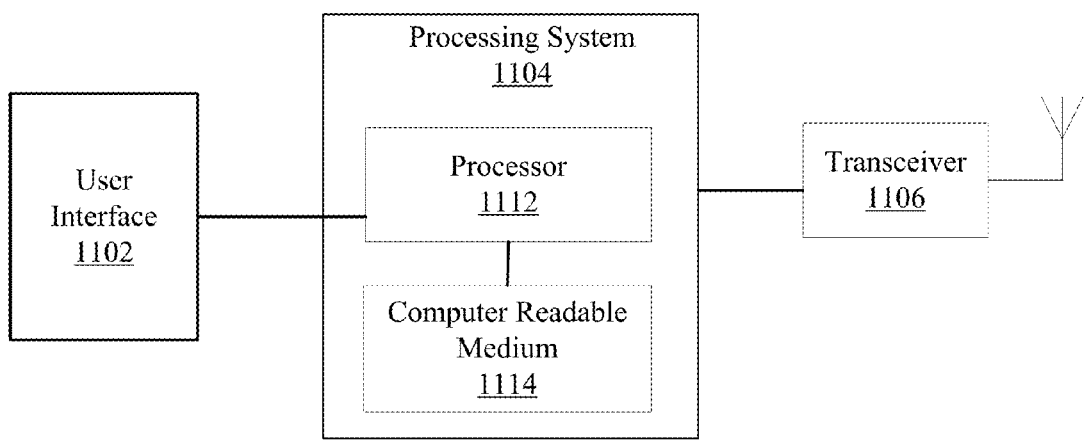
FIG. 11 is a conceptual block diagram of an access terminal.

FIG. 11 is a conceptual block diagram illustrating an example of system 1100 for transmitting SC-FDMA symbols. The system may be implemented, for example, by an access terminal. In this example, the system 1100 may include a user interface 1102 (e.g., a keyboard, display, speaker, microphone, joystick, and/or any other combination user interface devices), a processing system 1104, and a transceiver 1106. The processing system 1104 may have one or more processors represented generally by processor 1112 and a computer readable medium (e.g., memory) 1114.

The processing system 1104 may be implemented using software, hardware, or a combination of both. By way of example, the processor 1112 may be implemented with one or more, or any combination of, microprocessors, digital signal processors (DSP), application specific integrated circuits (ASIC), microcontrollers, field programmable gate arrays (FPGA) or other programmable logic, state machines, discrete gates, transistor logic, discrete hardware components, or some other processing entity designed to perform the various functions presented throughout this disclosure. Those skilled in the art will recognize how best to implement the described functionality for the processing system 1104 depending on the particular application and the overall design constraints imposed on the overall system.

Software shall be construed broadly to mean instructions, data, or any combination thereof, whether referred to as software, firmware, middleware, microcode, hardware description language, or otherwise. Computer readable medium may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The computer readable may be embodied in a computer product. The computer product may comprise packaging materials.

In the conceptual illustration presented in FIG. 11, the computer readable medium 1114 is shown as part of the processing system 1104 separate from the processor 1112. However, as those skilled in the art will readily appreciate, the computer readable medium 1114, or any portion thereof, may be external to the processing system 1104. By way of example, the computer readable medium 1114 may include a transmission line, a carrier wave modulated by data, and/or a computer product separate from the system 1100, all which may be accessed by the processor 1112 through an interface (not shown). Alternatively, or in addition to, the computer readable medium 1114, or any portion thereof, may be integrated into the processor 1112, such as the case may be with cache and/or general register files.

Transceiver 1106 may provide a transmitting and/or a receiving function. The transmitting function modulates a carrier with data for transmission over the wireless medium and the receiving function demodulates a carrier received over the wireless medium to recover data. Transceiver 1106 may also provide various other functions, such as RF front-end processing, analog/digital conversion, timing and frequency estimation, channel estimation, modulation coding scheme (MCS), etc.

The processor 1112 provides general processing functions, including the execution of software stored on the computer readable medium 1114. The software includes instructions that when executed by the processor 1112 cause the processing system 1104 to perform the various functions presented throughout this disclosure.

The functions and methods described herein may be implemented by various modules in the wireless device. As used in this disclosure, the term "modules" is intended to refer to either hardware, firmware, a combination of hardware and software, software, or software in execution. By way of example, a module may be a process, an object, an executable, a thread of execution, a program, an application, a routine, a subroutine, a block of code or instructions, or any other software executed by the processor 1112 or by another processing device. In this example, these modules may reside in the computer readable medium 1114 which represents a single storage device, multiple storage devices, or other media. By way of example, a module may be loaded into RAM from a larger storage device prior to execution. During execution, the processor 1112 may load the module, or any portion thereof into cache to increase access speed. One or more cache lines may then be loaded into a general register file for execution by the processor 1112. When referring to the functionality of a module in software applications, it will be understood that such functionality may be implemented by the processor 1112 when executing the module, or any portion thereof.

Figure 12:
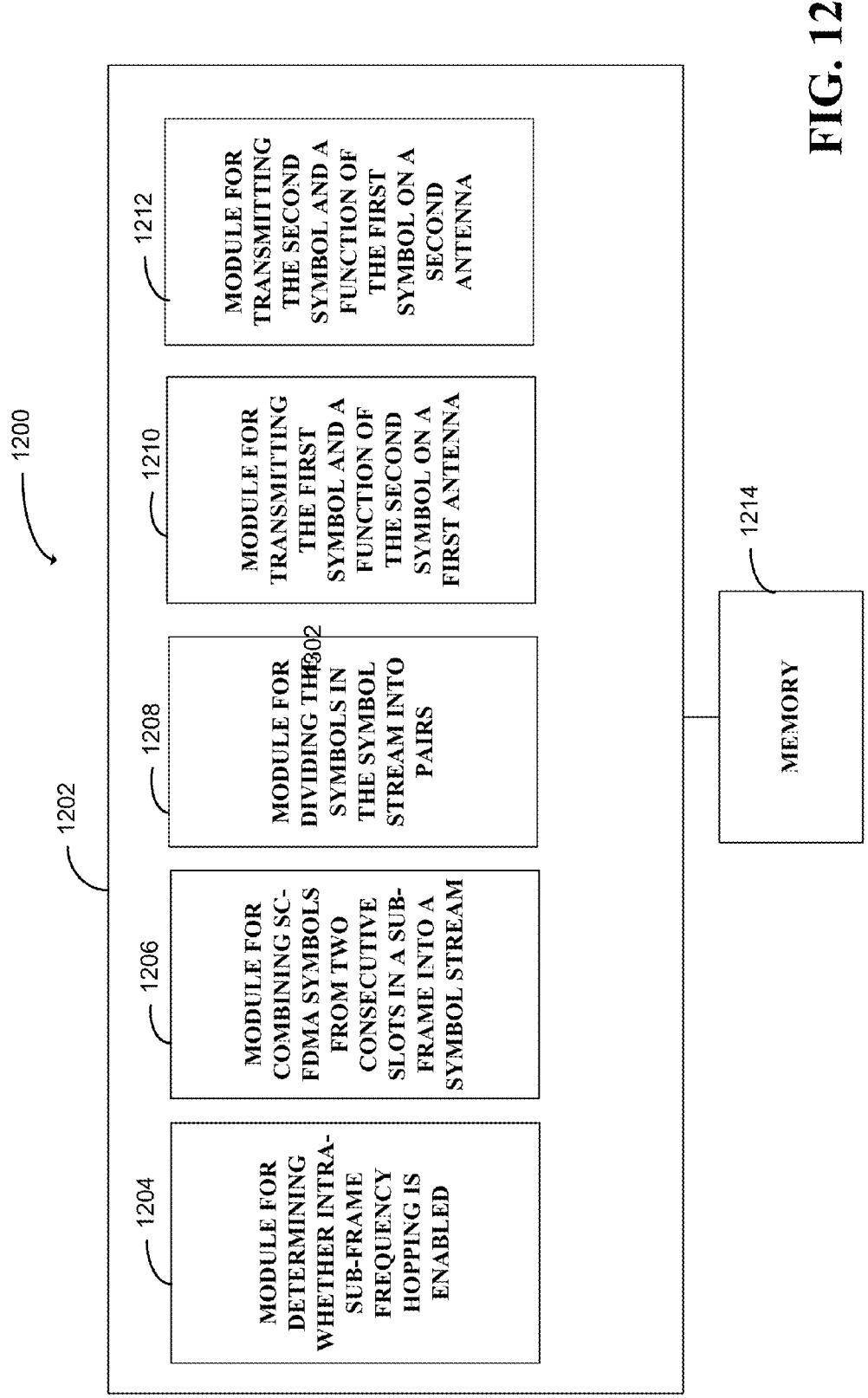
FIG. 12 depicts a system for transmitting uplink SC-FDMA symbols.

Turning to FIG. 12, illustrated is a system 1200 that facilitates transmitting uplink SC-FDMA symbols where intra-sub-frame frequency hooping is not enabled. For example, system 1100 can reside at least partially within a transmitter, access terminal, wireless device, UE, etc. As depicted, system 1200 includes functional blocks that can represent functions implemented by a processor, software, or combination thereof (e.g., firmware). System 1200 includes a logical grouping 1202 of electrical components. Logical grouping 1202 can include a module for determining whether intra-sub-frame frequency hopping is enabled 1204. Moreover, logical grouping 1202 can include a module for combining SC-FDMA symbols from two consecutive slots in a sub-frame into a symbol stream 1206. Furthermore, logical grouping 1202 can include a module for dividing the symbols in the symbol stream into pairs 1208. The logical grouping 1202 may also include a module for transmitting the first symbol and a function of the second symbol on a first antenna 1210. The logical grouping 1202 may additionally include a module for transmitting the second symbol and a function of the first symbol on a second antenna 1212. Additionally, system 1200 can include a memory 1214 that retains instructions for executing functions associated with electrical components 1204, 1206, 1208, 1210 and 1212. While shown as being external to memory 1214, it is to be understood that electrical components 1204, 1206, 1208, 1210, and 1212 can exist within memory 1214.

Figure 13:
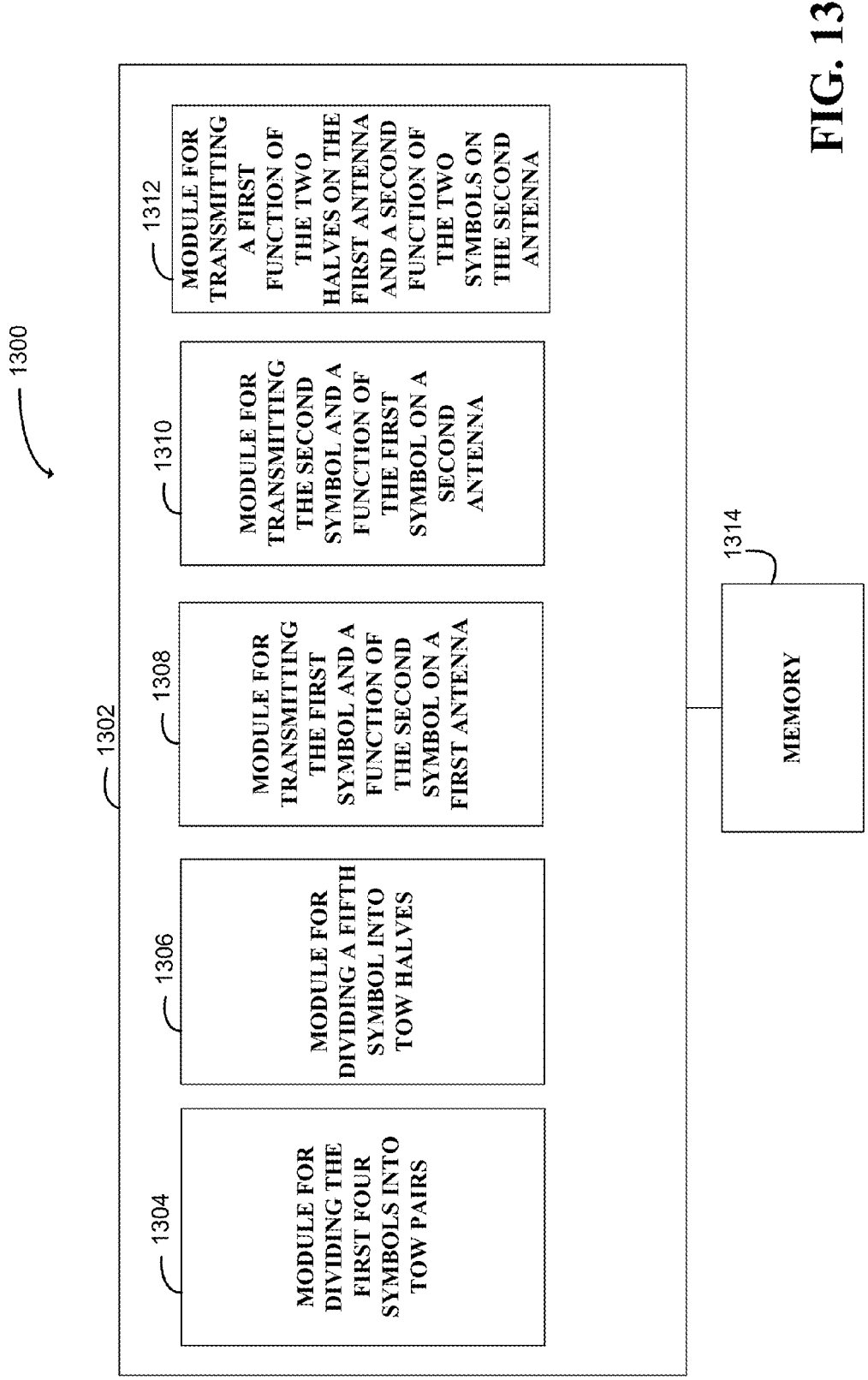
FIG. 13 depicts another system for transmitting uplink SC-FDMA symbols.

FIG. 13 illustrates a system 1300 that facilitates transmitting uplink SC-FDMA symbols where intra-sub-frame frequency hooping is enabled. For example, system 1300 can reside at least partially within a transmitter, access terminal, wireless device, UE, etc. As depicted, system 1300 includes functional blocks that can represent functions implemented by a processor, software, or combination thereof (e.g., firmware). System 1300 includes a logical grouping 1302 of electrical components. Logical grouping 1302 can include a module for dividing the first four symbols in a slot into two pairs 1304. Moreover, logical grouping 1302 can include a module dividing a fifth symbol into two halves 1306. Furthermore, logical grouping 1302 can include a module for transmitting the first symbol and a function of the second symbol on a first antenna 1308. The logical grouping 1302 may also include a module for transmitting the first symbol and a function of the second symbol on a first antenna 1310. The logical grouping 1302 may additionally include a module for transmitting a first function of the two halves on the first antenna and transmitting a second function of the two symbols on the second antenna 1312. Additionally, system 1300 can include a memory 1314 that retains instructions for executing functions associated with electrical components 1304, 1306, 1308, 1310 and 1312. While shown as being external to memory 1314, it is to be understood that electrical components 1304, 1306, 1308, 1310, and 1312 can exist within memory 1314.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for transmitting uplink Single-Carrier Frequency Division Multiple Access (SC-FDMA) symbols, comprising:
    determining whether intra-sub-frame frequency hopping is enabled;
    upon determining that the intra-sub-frame frequency hopping is not enabled:
        combining SC-FDMA symbols from two consecutive slots in a sub-frame into a symbol stream;
        dividing the SC-FDMA symbols in the symbol stream into pairs;
        for each pair of the pairs, transmitting a first symbol and a function of a second symbol on a first antenna; and
        for said each pair of the pairs, transmitting the second symbol and a function of the first symbol on a second antenna;
    upon determining that the intra-sub-frame frequency hopping is enabled:
        dividing a first even number of symbols in a slot of the sub-frame into two pairs;
        when the number of symbols in the slot of the sub-frame is odd, dividing a remaining symbol into two halves;
        for each pair of the two pairs, transmitting a first symbol and a function of a second symbol on the first antenna;
        for said each pair of the two pairs, transmitting the second symbol and a function of the first symbol on the second antenna; and
        when the number of said symbols in the slot of the sub-frame is odd, for the remaining symbol, transmitting a first function of the two halves on the first antenna and transmitting a second function of the two halves symbols on the second antenna.

2. The method of claim 1, wherein the function of the second symbol of said each pair of the pairs is a time reversed complex conjugate of the second symbol of said each pair of the pairs;

wherein the function of the second symbol of said each pair of the two pairs is a time reversed complex conjugate of the second symbol of said each pair of the two pairs.

3. The method of claim 1, wherein the function of the first symbol of said each pair of the pairs is a negative time reversed complex conjugate of the first symbol of said each pair of the pairs;
wherein the function of the first symbol of said each pair of the two pairs is a negative time reversed complex conjugate of the first symbol of said each pair of the two pairs.

4. The method of claim 1, wherein the first function of two halves is: IFFT(DFT([a(m1), a(m2)])), wherein a(m1) and a(m2) are a first half and a second half, respectively.

5. The method of claim 1, wherein the second function of the two halves is: IFFT(DFT([a(m1), −a(m2)]))*, wherein a(m1) and a(m2) are a first half and a second half, respectively.

6. The method of claim 1, wherein the uplink SC-FDMA symbols are transmitted on Long Term Evolution(LTE) Physical Uplink Shared Channel (PUSCH) channel.

7. The method of claim 1, wherein the uplink SC-FDMA symbols are transmitted with an extended cyclic prefix.

8. A system for transmitting uplink Single-Carrier Frequency Division Multiple Access (SC-FDMA) symbols, comprising:
means for determining whether intra-sub-frame frequency hopping is enabled;
upon determining that the intra-sub-frame frequency hopping is not enabled:
means for combining SC-FDMA symbols from two consecutive slots in a sub- frame into a symbol stream;
means for dividing the SC-FDMA symbols in the symbol stream into pairs;
for each pair of the pairs, means for transmitting a first symbol and a function of a second symbol on a first antenna; and
for said each pair of the pairs, means for transmitting the second symbol and a function of the first symbol on a second antenna;
upon determining that the intra-sub-frame frequency hopping is enabled:
means for dividing a first even number of symbols in a slot of the sub-frame into two pairs;
when the number of symbols in the slot of the sub-frame is odd, means for dividing a remaining symbol into two halves;
for each pair of the two pairs, means for transmitting a first symbol and a function of a second symbol on the first antenna;
for said each pair of the two pairs, means for transmitting the second symbol and a function of the first symbol on the second antenna; and
when the number of said symbols in the slot of the sub-frame is odd, for the remaining symbol, means for transmitting a first function of the two halves on the first antenna and transmitting a second function of the two halves symbols on the second antenna.

9. The system of claim 8, wherein the function of the second symbol of said each pair of the pairs is a time reversed complex conjugate of the second symbol of said each pair of the pairs;
wherein the function of the second symbol of said each pair of the two pairs is a time reversed complex conjugate of the second symbol of said each pair of the two pairs.

10. The system of claim 8, wherein the function of the first symbol of said each pair of the pairs is a negative time reversed complex conjugate of the first symbol of said each pair of the pairs;
wherein the function of the first symbol of said each pair of the two pairs is a negative time reversed complex conjugate of the first symbol of said each pair of the two pairs.

11. The method of claim 8, wherein the first function of the two halves is: IFFT(DFT([a(m1), a(m2)])), wherein a(m1) and a(m2) are a first half and a second half, respectively.

12. The method of claim 8, wherein the second function of the two halves is: IFFT(DFT([a(m1), −a(m2)]))*, wherein a(m1) and a(m2) are a first half and a second half, respectively.

13. The system of claim 8, wherein the uplink SC-FDMA symbols are transmitted on Long Term Evolution(LTE) Physical Uplink Shared Channel (PUSCH) channel.

14. The system of claim 8, wherein the uplink SC-FDMA symbols are transmitted with an extended cyclic prefix.

15. A system for transmitting uplink Single-Carrier Frequency Division Multiple Access (SC-FDMA) symbols, comprising:
a first antenna;
a second antenna;
a first module configured to determine whether intra-sub-frame frequency hopping is enabled;
a second module configured to combine, upon determining that the intra-sub-frame frequency hopping is not enabled, SC-FDMA symbols from two consecutive slots in a sub-frame into a symbol stream; and
a transmit diversity module configured to divide the SC-FDMA symbols in the symbol stream into pairs, to transmit a first symbol and a function of a second symbol in each pair of the pairs on the first antenna, and to transmit the second symbol and a function of the first symbol in said each pair of the pairs on the second antenna;
upon determining that the intra-sub-frame frequency hopping is enabled:
divide a first even number of symbols in a slot of the sub-frame into two pairs;
when the number of symbols in the slot of the sub-frame is odd, divide a remaining symbol into two halves;
for each pair of the two pairs, transmit a first symbol and a function of a second symbol on the first antenna;
for said each pair of the two pairs, transmit the second symbol and a function of the first symbol on the second antenna; and
when the number of said symbols in the slot of the sub-frame is odd, for the remaining symbol, transmit a first function of the two halves on the first antenna and transmitting a second function of the two halves symbols on the second antenna.

16. The system of claim 15, wherein the function of the second symbol of said each pair of the pairs is a time reversed complex conjugate of the second symbol of said each pair of the pairs;
wherein the function of the second symbol of said each pair of the two pairs is a time reversed complex conjugate of the second symbol of said each pair of the two pairs.

17. The system of claim 15, wherein the function of the first symbol of said each pair of the pairs is a negative time reversed complex conjugate of the first symbol of said each pair of the pairs;

wherein the function of the first symbol of said each pair of the two pairs is a negative time reversed complex conjugate of the first symbol of said each pair of the two pairs.

18. The method of claim 15, wherein the first function of the two halves is: IFFT(DFT([a(m1), a(m2)])), wherein a(m1) and a(m2) are a first half and a second half, respectively.

19. The method of claim 15, wherein the second function of the two halves is: IFFT(DFT([a(m1), −a(m2)]))*, wherein a(m1) and a(m2) are a first half and a second half, respectively.

20. The system of claim 15, wherein the uplink SC-FDMA symbols are transmitted on Long Term Evolution (LTE) Physical Uplink Shared Channel (PUSCH) channel.

21. The system of claim 15, wherein the uplink SC-FDMA symbols are transmitted with an extended cyclic prefix.

22. A computer program product, comprising:
a non-transitory computer-readable medium, comprising:
code for determining whether intra-sub-frame frequency hopping is enabled;
upon determining that the intra-sub-frame frequency hopping is not enabled:
code for combining Single-Carrier Frequency Division Multiple Access (SC-FDMA) symbols from two consecutive slots in a sub-frame into a symbol stream;
code for dividing the SC-FDMA symbols in the symbol stream into pairs;
for each pair of the pairs, code for transmitting a first symbol and a function of a second symbol on a first antenna; and
for said each pair of the pairs, code for transmitting the second symbol and a function of the first symbol on a second antenna;
upon determining that the intra-sub-frame frequency hopping is enabled:
code for dividing a first even number of symbols in a slot of the sub-frame into two pairs;
when the number of symbols in the slot of the sub-frame is odd, code for dividing a remaining symbol into two halves;
for each pair of the two pairs, code for transmitting a first symbol and a function of a second symbol on the first antenna;
for said each pair of the two pairs, code for transmitting the second symbol and a function of the first symbol on the second antenna; and
when the number of said symbols in the slot of the sub-frame is odd, for the remaining symbol, code for transmitting a first function of the two halves on the first antenna and transmitting a second function of the two halves symbols on the second antenna.

23. The computer program product of claim 22, wherein the function of the second symbol of said each pair of the pairs is a time reversed complex conjugate of the second symbol of said each pair of the pairs;
wherein the function of the second symbol of said each pair of the two pairs is a time reversed complex conjugate of the second symbol of said each pair of the two pairs.

24. The computer program product of claim 22, wherein the function of the first symbol of said each pair of the pairs is a negative time reversed complex conjugate of the first symbol of said each pair of the pairs;
wherein the function of the first symbol of said each pair of the two pairs is a negative time reversed complex conjugate of the first symbol of said each pair of the two pairs.

25. The method of claim 22, wherein the first function of the two halves is: IFFT(DFT([a(m1), a(m2)])), wherein a(m1) and a(m2) are a first half and a second half, respectively.

26. The method of claim 22, wherein the second function of the two halves is: IFFT(DFT([a(m1), −a(m2)]))*, wherein a(m1) and a(m2) are a first half and a second half, respectively.

27. The computer program product of claim 22, wherein the uplink SC-FDMA symbols are transmitted on Long Term Evolution (LTE) Physical Uplink Shared Channel (PUSCH) channel.

28. The computer program product of claim 22, wherein the uplink SC-FDMA symbols are transmitted with an extended cyclic prefix.

* * * * *